Dec. 29, 1964 S. R. CRAY 3,163,772

REGENERATIVE CIRCUIT

Filed Nov. 24, 1959

INVENTOR

SEYMOUR R. CRAY

BY Cushman, Darby + Cushman

ATTORNEYS

1

3,163,772

REGENERATIVE CIRCUIT

Seymour R. Cray, Minneapolis, Minn., assignor to Sperry Rand Corporation, New York, N.Y., a corporation of Delaware Filed Nov. 24, 1959, Ser. No. 855,188
3 Claims. (Cl. 307—88.5)

This invention relates to a regenerative circuit and more particularly to a transistorized switching network which can be utilized as a logical element in a digital computer.

In the past regeneration circuits similar to the type herein have necessarily employed overlapping clock pulses for causing storage, by aid of a regenerative loop, of an input signal temporarily but long enough to allow the stored signal to be sampled and transferred to the next stage. This invention obviates the need of overlapping clock pulses and their relatively more complex sources, by effectively including a delay in the forward path of the regenerative loop.

Digital computers which operate on the binary system of numbers, make extensive use of elements which are capable of being switched from one state to another. Since the only digits used in the binary system are "1" and "0," one state is arbitrarily selected as the "0" state while the other state is indicative of a "1." Said "1" and "0" states are used in combinations to perform logical functions, such as gating and switching.

Transistors are well known in the art as being readily adaptable to use as elements described above since proper application of potentials to a transistor will cause it to turn on or turn off. Generally, a single transistor is normally maintained in a single state, on or off. Application of a potential to the proper transistor element will cause it to change to its other state. Removal of said potential will cause the transistor to return to its normal state. Utilized in this manner, the transistor is a monostable element. This invention combines two transistors in tandem together with a feedback path such that the combination appears as a bistable element to the degree of effecting the delay above mentioned. Each of the states is maintained for a period of time to enable the use of the "1" or "0" as indicated by each state, in some logical operation, before allowing said bistable circuit to change its state.

It is therefore an object of this invention to provide a regenerative logical circuit including a delay in the forward path of the regenerative loop and operable with non-overlapping clock pulses.

Another object of this invention is to provide a transistorized regenerative circuit as in the foregoing object wherein the state cannot change for a fixed period of time.

Other objects of this invention will be apparent to those familiar with the art upon study of the following description and drawings in which.

Figure 1:
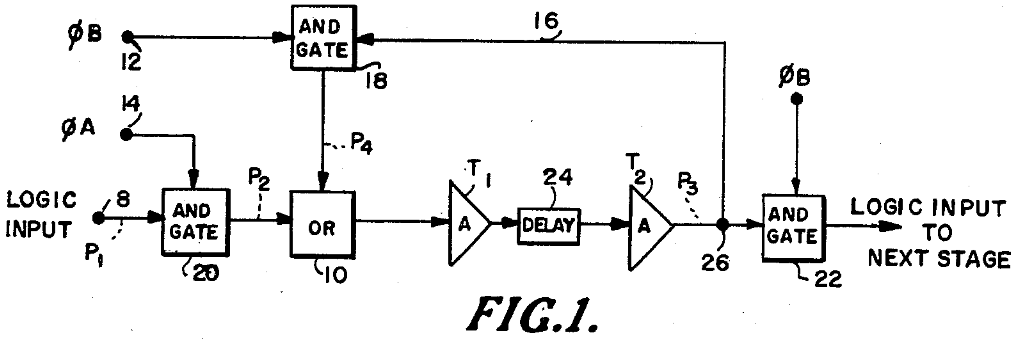
FIGURE 1 is a block diagram of the circuit of this invention.

The block diagram of FIGURE 1 shows the logical operation of the circuit of this invention according to the rules of Boolean algebra as described in Richards' "Arithmetic Operation In Digital Computers," D. Van Nostrand Co., Inc., 1955. The input to amplifier $T_1$ will be a "1" if either or both of the two inputs to OR circuit 10 is a "1." Since each of the said inputs is transmitted from an AND gating circuit, the input to amplifier $T_1$ will be a "1" if the inputs to AND circuit 18, consisting of $\phi B$ at terminal 12 and the signal via regeneration line 16, are

2 both "1's" or if the inputs to AND circuit 20, consisting of signal $\phi A$ at terminal 14 and the logic input at terminal 8, are both "1's." Each of the amplifiers, $T_1$ and $T_2$, is a single inverter, i.e., a "1" input to the amplifier will result in a "0" output and a "0" input will result in a "1" output. This operation will be subsequently described and is well known in the art. If the input to amplifier $T_1$ is a "1," the output therefrom will be a "0" and, since said output is an input to amplifier $T_2$ through delay 24, the output from $T_2$ will be a "1." Since the output from $T_2$ is fed back to the input of $T_1$ via line 16 through AND circuit 18 and OR circuit 10, the previously described states of $T_1$ and $T_2$ will be maintained as long as the $\phi B$ input to AND circuit 18 is a "1." When $\phi B$ goes to a "0," the input to $T_1$ from AND circuit 18 will be a "0" and the state of $T_1$ will be dependent on whether the input from AND circuit 20 is a "1" or a "0."

Figure 3:
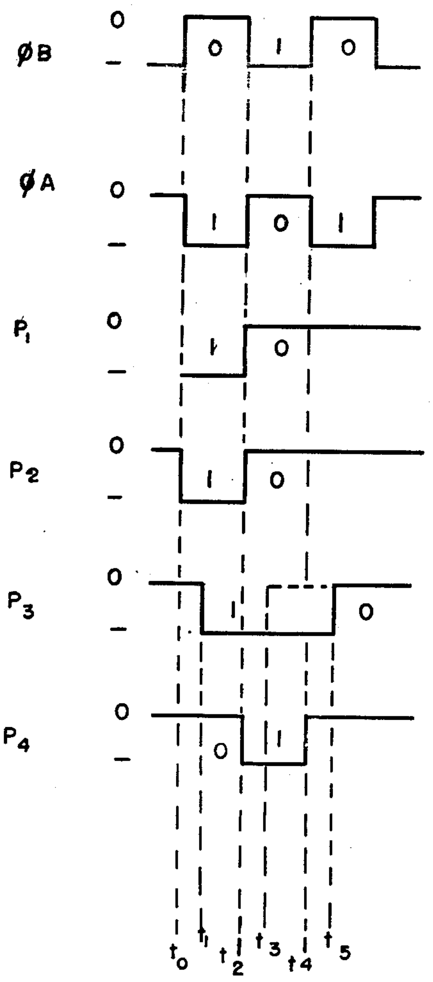
FIGURE 3 shows the idealized waveforms of the signals at various points in the circuit.

Symbols $\phi A$ and $\phi B$ above indicate clock power pulses which are applied to terminals 14 and 12 respectively. FIGURE 3 shows the waveforms of those clock pulses in relation to each other, time being along a horizontal line and magnitude being in the vertical direction. For purposes of this description, a zero or ground potential signifies a "0" while a negative potential is indicative of a "1." As shown in FIGURE 3, clock pulse $\phi A$ is the inverse of clock pulse $\phi B$, i.e., when $\phi A$ is "0," $\phi B$ is "1" and vice versa.

Assume the output of amplifier $T_2$ is a "0" so that line 16 is a "0," and the logic input at terminal 8 is a "1" from time $t_0$ until time $t_2$ as shown by waveform $P_1$ in FIGURE 3. At time $t_0$, when $\phi A$ becomes a "1," the input to $T_1$ from AND circuit 20, as shown by waveform $P_2$, through OR circuit 10 will be a "1." As mentioned previously, the "1" input to $T_1$ will appear as a "0" input to amplifier $T_2$ and as a "1" output therefrom on line 16. As shown by waveform $P_3$, that output will not reach the "1" level until time $t_1$ because of delay 24. The dotted line portion of waveform $P_3$ shows that the output would return to the "0" state at time $t_3$ if no means were provided to prevent this. That is, the output from $T_2$ would follow the input to $T_1$ but would be displaced by some finite time equal to the delay. However, at time $t_2$, clock pulse $\phi B$ becomes a "1" and since the output from $T_2$ is a "1" and combines with $\phi B$ at AND circuit 18, a "1" as shown by waveform $P_4$ is presented to the input of $T_1$ via this feedback loop. Therefore the states of $T_1$ and $T_2$ will remain unchanged until $\phi B$ goes to a "0." At the same time that $\phi B$ goes to a "1" at time $t_2$, $\phi A$ goes to a "0" which prevents any change in the input to $T_1$ via the logic input at terminal 8. When $\phi B$ goes to "0" and $\phi A$ goes to "1" at time $t_4$, the input to $T_1$ will be dependent upon the logic input at terminal 8. Since the logic input is a "0" starting at time $t_2$ as shown by waveform $P_1$ (though it could have remained a "1" until time $t_4$ without changing the results), the input to $T_1$ will be a "0" and so the output from $T_2$ as shown by waveform $P_3$ will fall to a "0" at time $t_5$ and remain so until changed by a subsequent "1" logic input. It may be noted that the negative pulse in waveform $P_3$ has a duration equal to two successive "1" and "0" $\phi A$ (or $\phi B$) pulses. The waveforms of FIGURE 3 are idealized but are sufficient for purposes of this description.

From the foregoing description it can be seen that an input to $T_1$ will be maintained even after the logic input signal is removed so that the circuit, as exemplified by the block diagram of FIGURE 1, will have the appearance of a bistable element. The input terminal 26 will remain negative as a representative of the logic input signal for a duration equal to the time between the time waveform $P_2$ becomes negative ($t_0$ in the example, though it could be later) and the end of the following enablement of the AND gating circuit 18 by $\phi B$ at time $t_4$ if the logic input signal at terminal 8 remains a "1" no longer than time $t_4$ but stays a "1" until after time $t_2$ less the time attributable to delay 24, i.e., after $t_2-(t_1-t_0)$. Because the feedback path, by which such state is maintained, is controlled by clock phase $\phi B$, each of the apparent two stable states is maintained only for a finite period of time. The loop including delay 24, feedback line 16, AND circuit 18 and back to delay 24 may be considered a "regeneration" loop, with the OR circuit being its input and terminal 26 being its output.

Delay 24 is of prime importance to this invention. Because of the delay, even though the input to $T_1$ from AND circuit 20 goes to a "0" at time $t_2$, the output of $T_2$ remains a "1" for a following short period of time, i.e., to time $t_3$, so that the $\phi B$ pulse can maintain the "1" input to $T_1$. If the output of $T_2$ followed, in time unison, the input to $T_1$, in order to insure maintenance of a "1" input to $T_1$, clock pulse $\phi B$ would have to overlap $\phi A$. Since in this invention such overlap is not required because of the delay, clock pulse $\phi A$ can be the inversion of $\phi B$ so that the circuit for generating the clock pulses is simpler to achieve. This invention utilizes the inherent characteristics of serially connected transistor circuits to achieve the required delay, as will be shown by the subsequent description of FIGURE 2.

The advantage and desirability of this type of logical element circuitry can best be described by describing its use in a synchronous computer. A multiplicity of outputs can be obtained from $T_2$ at junction 26. The limitation as to the possible number of outputs depends on the design of the circuit. In FIGURE 1 is shown at junction 26 one output in addition to the feedback path to amplifier $T_1$. This output becomes the logical input to another identical logical element circuit, such as the input at point 8. In a synchronous machine, a definite time relationship must be maintained in transmitting information from one logical element to the next. The output of the logical circuit element of FIGURE 1 must be transmitted to the next stage under control of clock pulse $\phi B$, as by AND circuit 22 connected in FIGURE 1 to output terminal 26. In other words, the logic input to each logical element must be clocked by a pulse of the opposite phase of the input clock of the previous logical element. It should be remembered that the term "logical element" used herein refers to the circuitry previously described. Although delay 24 is great enough to insure that the logical element will maintain a "1" once it has been set to a "1" by a logic input, it is not enough delay to insure that the next subsequent logical element will be switched from a "0" state to a "1" state. That is, if the output of $T_2$ followed the dotted line shown in waveform $P_3$, the length of time that $\phi B$ and that output would be coincident "1's" would be too short to give the required length of "1" input to the next stage. Since it takes a finite time to switch amplifier $T_1$ from the "0" state to the "1" state, the difference in time between times $t_3$ and $t_2$ in the preceding logical element becomes very significant if no feedback path is employed and slight variations particularly decreases thereof could create troublesome results. However, by providing the feedback path via line 16 under control of clock pulse $\phi B$, the output of $T_2$ is maintained during the entire time that $\phi B$ is a "1" thereby allowing ample time to switch the next logical element from the "0" to the "1" state.

Figure 2:
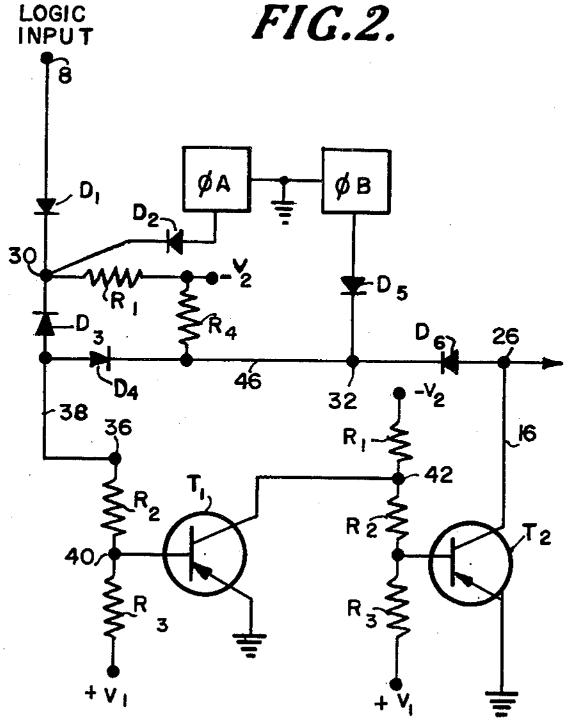
FIGURE 2 is a schematic diagram of an embodiment of this invention.

FIGURE 2 is a schematic diagram of the block diagram of FIGURE 1. Amplifiers $T_1$ and $T_2$ are pnp type transistors. The circuit is designed, according to well known principles, that application of a negative potential to the base element of the transistor will cause it to conduct to virtual saturation so that the potential on the collector element is essentially equal to that of the emitter element which is at ground or zero potential. A positive potential applied to the base element will cause the transistor to be in the non-conductive state. In this manner, the transistors act as switches. The AND and OR circuits are formed by diodes and resistors in a conventional manner. Diodes $D_1$ and $D_2$ are oriented such that in conjunction with the negative $V_2$ potential applied via resistor $R_1$, junction 30 cannot be negative, indicative of a "1", unless both clock pulse $\phi A$ and the input are both negative. Likewise, diodes $D_5$ and $D_6$ are oriented such that in conjunction with the negative voltage $V_2$ applied via resistor $R_4$, if either the collector element of $T_2$ or clock pulse $\phi B$ is at ground potential, indicative of a "0," junction 32 will also be at ground potential indicating a "0;" but if both the $T_2$ collector and $\phi B$ are negative indicating "1's," then junction 32 will be negative or "1." The orientation of diodes $D_3$ and $D_4$, which comprise the OR circuit, is such that if junction 30 or 32 is negative, junction 36 will be negative via connection 38.

A typical operation of this circuit can best be described starting with the same assumptions used to describe the block diagram of FIGURE 1, that is, the output of $T_2$ is a "0," which signifies that $T_2$ is in the conductive state. Also, the logic input at terminal 8 is a negative potential, indicative of a "1." When clock pulse $\phi A$ is negative, junction 30 becomes negative and this is transmitted to junction 36 through diode $D_3$ via connection 38. The voltage divider consisting of resistors $R_3$ and $R_2$ connected to voltage $+V_1$, is designed such that when junction 36 is negative, junction 40 and the base element $T_1$ connected thereto will be negative. This will cause transistor $T_1$ to conduct, placing its collector element at ground. Junction 42, which is connected to the collector element $T_1$ will therefore be at ground so that a positive potential from voltage $+V_1$ will appear at junction 44. Since junction 44 is connected to the base element of transistor $T_2$, that transistor will cut off. Because of the inherent delay in changing the conditions or states of transistors $T_1$ and $T_2$, particularly the latter, transistor $T_2$ remains cut off for some finite time after clock $\phi A$ goes to "0." With the collector circuit open because $T_2$ is cut off, and clock pulse $\phi B$ negative, junction 32 will be negative thereby maintaining junction 36 negative via the regeneration connection 46, diode $D_4$ and connection 38.

From the foregoing, it will be appreciated that by utilizing the inherent delays in transistor circuits in conjunction with a feedback path, along with two clock pulses, one of which is the inversion of the other, an element capable of performing the high speed logical operations of a synchronous digital computer has been invented. This invention may be employed with a clock frequency of two megacycles.

Although the specification above has described the circuit of this invention utilizing pnp type transistors, this invention is not limited to said types. Proper circuit design makes this invention readily adapted to use with other transistor types, such as npn.

Thus it is apparent that there is provided by this invention systems in which the various objects and advantages herein set forth are successfully achieved.

Modifications of this invention now described herein will become apparent to those of ordinary skill in the art after reading this disclosure. Therefore, it is intended that the matter contained in the foregoing description and the accompanying drawings be interpreted as illustrative and not limitative, the scope of the invention being defined in the appended claims.

What is claimed is:

1. For use in a synchronous binary computer, in combination: a source of a pair of symmetrical oppositely-phased synchronizing signals, each of said signals repetitively alternating between an "on" and "off" condition; a logic stage comprising input means for receiving logic signals from other stages and for locally combining said received logic signals to develop a stage logic signal, amplifying means including signal delay means for amplifying said stage logic signal for providing a stage output logic signal, and means for applying at least part of said stage output logic signal to said input means; and means for gating the logic signals received from other stages with one of the pair of synchronizing signals and for gating the applied stage output logic signal with the other of said synchronizing signals such that the stage logic signal is developed during the "on" condition of the one of the synchronizing signals and the stage output logic signal is maintained during the "on" condition of the other of the synchronizing signals.

2. As a logic stage for a synchronous binary computer having two oppositely-phased non-overlapping synchronizing signals which repetitively alternate between "on" and "off" conditions, in combination: a logic input for receiving logic signals generated by other stages of the computer; a first AND circuit for gating said logic inputs by the "on" condition of one of the synchronizing signals; an OR circuit having first input means for receiving said gated logic signals; and amplifier circuit including signal delay means for amplifying the output of said OR circuit, said amplified signal being the output logic signal of the stage corresponding to the logical combination of said gated logic input signals; and a second AND circuit for gating said stage logic output signal with the "on" condition of the other synchronizing signal into further input means in said OR circuit such that the output logic signal appears substantially unchanged for successive "on" conditions of the respective synchronizing signals.

3. As a logic stage for a synchronous binary computer having two oppositely-phased synchronizing signals which repetitively alternate between "on" and "off" conditions, in combination: input means including means for receiving logic signals from other stages and for logically combining said received logic signals to form a stage logic signal; amplifying means including signal delay means for amplifying said stage logic signal to provide a corresponding stage output logic signal; means for applying at least part of said stage output signal to said input means; said input means further including means for gating said received logic signals with one of the synchronizing signals and means for gating the applied stage output signal with the other synchronizing signal such that the stage logic signal is formed during the "on" condition of one of the synchronizing signals and is unalterably maintained during the "on" condition of the other synchronizing signal.

References Cited in the file of this patent

UNITED STATES PATENTS

| | | |
|---|---|---|
| 2,693,907 | Tootill | Nov. 9, 1954 |
| 2,823,855 | Nelson | Feb. 18, 1958 |
| 2,892,936 | Paivinen | June 30, 1959 |
| 2,933,625 | Townsend et al. | Apr. 19, 1960 |
| 2,942,192 | Lewis | June 21, 1960 |
| 2,975,365 | Saxenmeyer | Mar. 14, 1961 |

OTHER REFERENCES

RCA Technical Note No. 128, rec'd in Patent Office March 12, 1958; published by RCA, Princeton, N. J.